(12) United States Patent
Yamamoto (10) Patent No.: US 9,077,261 B2
(45) Date of Patent: Jul. 7, 2015

(54) WIRELESS POWER TRANSMISSION SYSTEM AND POWER TRANSMITTER

(71) Applicant: Panasonic Corporation, Osaka (JP)

(72) Inventor: Hiroshi Yamamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 216 days.

(21) Appl. No.: 13/736,370

(22) Filed: Jan. 8, 2013

(65) Prior Publication Data

US 2013/0188408 A1 Jul. 25, 2013

Related U.S. Application Data

(60) Provisional application No. 61/590,466, filed on Jan. 25, 2012.

(51) Int. Cl.
*H02M 7/757* (2006.01)
*H02M 7/42* (2006.01)
*H02J 5/00* (2006.01)
H02M 7/797 (2006.01)

(52) U.S. Cl.
CPC . *H02M 7/42* (2013.01); *H02J 5/005* (2013.01)

(58) Field of Classification Search
USPC ............ 363/44–53, 125–127, 130, 140
See application file for complete search history.

(56) References Cited

U.S. PATENT DOCUMENTS

| 5,491,624 | A | * | 2/1996 | Levran et al. ............... 363/87 |
| 2008/0278264 | A1 | | 11/2008 | Karalis et al. |
| 2012/0161538 | A1 | | 6/2012 | Kinoshita et al. |

FOREIGN PATENT DOCUMENTS

| JP | 2003-338357 A | 11/2003 |
| JP | 2005-204405 A | 7/2005 |
| JP | 2006-093896 A | 4/2006 |
| JP | 2008-028791 A | 2/2008 |
| JP | 2012-146289 A | 8/2012 |

OTHER PUBLICATIONS

International Search Report for corresponding International Application No. PCT/JP2012/008302 mailed Mar. 26, 2013.
Form PCT/ISA/237 for corresponding International Application No. PCT/JP2012/008302 dated Mar. 26, 2013 and partial English translation.

* cited by examiner

*Primary Examiner* — Adolf Berhane
*Assistant Examiner* — Nusrat Quddus
(74) *Attorney, Agent, or Firm* — Renner, Otto, Boisselle & Sklar, LLP.

(57) ABSTRACT

A wireless power transmission system includes: a power transmitting section that converts DC energy input from a DC energy source into AC energy of a frequency f0; a transmitting antenna; and a receiving antenna. The power transmitting section includes: a class-E oscillator circuit including a switching element and a capacitor which are connected in parallel to the DC energy source, for converting the DC energy into the AC energy; and a switching control section that inputs a control signal for controlling a conduction state of the switching element to the switching element. The switching control section switches the switching element from a non-conductive state to a conductive state when a preset time period has elapsed or when a potential difference across the switching element takes a local minimum value after the switching element is switched from the conductive state to the non-conductive state.

9 Claims, 11 Drawing Sheets

ANTENNA GAP: SMALL    ANTENNA GAP: LARGE (b)    (c)

FIG. 7A

Vds IS LOCAL MINIMUM VALUE ⇒ TURN ON GATE

FIG. 7B

Vds=0 ⇒ TURN ON GATE

WIRELESS POWER TRANSMISSION SYSTEM AND POWER TRANSMITTER

This application claims priority under 35 USC §119(e) to U.S. Provisional Application No. 61/590,466 filed on Jan. 25, 2012, the entire contents of which are incorporated herein by reference.

BACKGROUND

1. Technical Field

The present disclosure relates to a wireless power transmission system and a power transmitter for wirelessly transmitting an electric power by resonant magnetic coupling.

2. Description of the Related Art

In recent years, there has been proposed a technology of wirelessly transmitting an electric power (in a contactless manner) by a novel method called "a resonant magnetic coupling method." For example, in a wireless power transmission system disclosed in US 2008/0278264, two resonators (antennas) are magnetically coupled together via the evanescent tail of oscillation energy generated in space in the vicinity of the resonators, to thereby wirelessly transmit the oscillation energy. The wireless power transmission utilizing the resonant magnetic coupling method can drastically increase the transmission distance as compared to a conventional method utilizing electromagnetic induction. It is said that satisfactory energy transmission can be performed when the coupling coefficient k between the resonators is larger than the square root of the product of attenuation constants Γ1 and Γ2 of the resonators.

SUMMARY

In the wireless power transmission utilizing the resonant magnetic coupling method, it is necessary to match input/output impedance of circuit blocks on a transmission path in order to maintain high transmission efficiency. Therefore, the circuit constants (inductance and capacitance) of a transmitting-side circuit block and a receiving-side circuit block are determined at the time of system design so as to match with preset input/output impedance of two resonators.

The system having the preset circuit constants, however, has a problem in that transmission efficiency decreases when an environment around the antenna has changed during power transmission to change the impedance of the two resonators. For example, when a gap between a transmitting-side resonator (transmitting antenna) and a receiving-side resonator (receiving antenna) has changed or when a substance such as a metal or a magnetic material has entered between the antennas, the input impedance of the transmitting antenna and the output impedance of the receiving antenna may change. In such a case, impedance mismatch occurs on the transmission path, resulting in decreased transmission efficiency.

This problem may occur not only in such a wireless power transmission system but also in a power transmitter that provides common electrical appliances, impedance of which may change, with AC power.

An embodiment of the present disclosure solves the problem described above, and provides a wireless power transmission technology capable of suppressing a decrease in transmission efficiency even when an environment around an antenna has changed. Another embodiment of the present disclosure provides a power transmitting technology capable of providing a load, impedance of which may change, with AC power stably.

In one general aspect, a wireless power transmission system includes: a power transmitting section for converting DC energy input from a DC energy source into AC energy of a frequency f0; a transmitting antenna for transmitting the AC energy converted by the power transmitting section; and a receiving antenna for receiving and outputting at least part of the AC energy transmitted by the transmitting antenna. The power transmitting section includes: a class-E oscillator circuit including a switching element and a capacitor which are connected in parallel to the DC energy source, for converting the DC energy into the AC energy; and a switching control section for inputting a control signal for controlling a conduction state of the switching element to the switching element. The switching control section uses the control signal to switch the switching element from a non-conductive state to a conductive state one of when a preset time period determined by a value of the frequency f0 has elapsed and when a potential difference across the switching element takes a local minimum value after the switching element is switched from the conductive state to the non-conductive state.

In another general aspect, a power transmitter converts DC energy input from a DC energy source into AC energy of a frequency f0. The power transmitter includes: a class-E oscillator circuit including a switching element and a capacitor which are connected in parallel to the DC energy source, for converting the DC energy into the AC energy; and a switching control section for inputting a control signal for controlling a conduction state of the switching element to the switching element. The switching control section uses the control signal to switch the switching element from a non-conductive state to a conductive state one of when a preset time period determined by a value of the frequency f0 has elapsed and when a potential difference across the switching element takes a local minimum value after the switching element is switched from the conductive state to the non-conductive state.

According to the exemplary embodiments of the present disclosure, the decrease in power transmission efficiency caused by impedance mismatch on a transmission path can be suppressed.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Referring to the accompanying drawings, embodiments of the present disclosure are described below. In the following description, the same or corresponding components are denoted by the same reference symbols.

In one general aspect, a wireless power transmission system includes: a power transmitting section configured to convert DC energy input from a DC energy source into AC energy of a frequency f0; a transmitting antenna configured to transmit the AC energy converted by the power transmitting section; and a receiving antenna configured to receive and output at least part of the AC energy transmitted by the transmitting antenna. The power transmitting section includes: a class-E oscillator circuit including a switching element and a capacitor which are connected in parallel to the DC energy source, the class-E oscillator circuit configured to convert the DC energy into the AC energy; and a switching control section configured to input a control signal for controlling a conduction state of the switching element to the switching element, and use the control signal to switch the switching element from a non-conductive state to a conductive state one of when a preset time period determined by a value of the frequency f0 has elapsed and when a potential difference across the switching element takes a local minimum value after the switching element is switched from the conductive state to the non-conductive state.

In one embodiment, the switching control section is configured to use the control signal to switch the switching element from the non-conductive state to the conductive state when the potential difference across the switching element becomes 0 after the switching element is switched from the conductive state to the non-conductive state.

In another embodiment, the wireless power transmission system further comprises an input control section configured to control a magnitude of the DC energy input to the power transmitting section in accordance with fluctuations in the AC energy output from the power transmitting section.

In another embodiment, the power transmitting section further includes a differential voltage measurement section configured to measure a differential value of a voltage across the switching element and output the measured differential value to the switching control section, and the switching control section is configured to detect, based on an output of the differential voltage measurement section, a timing at which the potential difference across the switching element becomes local minimum.

In another embodiment, the power transmitting section further includes a voltage measurement section configured to measure a value of a voltage across the switching element and output the measured value to the switching control section. The switching control section is configured to detect, based on an output of the voltage measurement section, a timing at which the potential difference across the switching element becomes local minimum.

In another embodiment, the switching element includes a field-effect transistor, and the switching control section inputs the control signal to a gate of the switching element, thereby controlling a conduction state between a source and a drain of the switching element.

In another embodiment, the wireless power transmission system further includes an output converting section configured to convert the AC energy output from the receiving antenna into one of DC energy and AC energy of a frequency lower than the AC energy and outputting the converted energy.

In another embodiment, the wireless power transmission system further includes a DC energy source configured to input the DC energy to the class-E oscillator circuit.

In another general aspect, a power transmitter converts DC energy input from a DC energy source into AC energy of a frequency f0. The power transmitter includes: a class-E oscillator circuit including a switching element and a capacitor which are connected in parallel to the DC energy source, the class-E oscillator circuit configured to convert the DC energy into the AC energy; and a switching control section configured to input a control signal for controlling a conduction state of the switching element to the switching element, the switching control section being configured to use the control signal to switch the switching element from a non-conductive state to a conductive state one of when a preset time period determined by a value of the frequency f0 has elapsed and when a potential difference across the switching element takes a local minimum value after the switching element is switched from the conductive state to the non-conductive state.

In another embodiment, the switching control section is configured to use the control signal to switch the switching element from the non-conductive state to the conductive state when the potential difference across the switching element becomes 0 after the switching element is switched from the conductive state to the non-conductive state.

In another embodiment, the power transmitter further includes an input control section configured to control a magnitude of the input DC energy in accordance with fluctuations in the AC energy output from the oscillator circuit.

Hereinafter, embodiments of the present disclosure will be described more specifically.

Embodiment 1

Figure 1A:
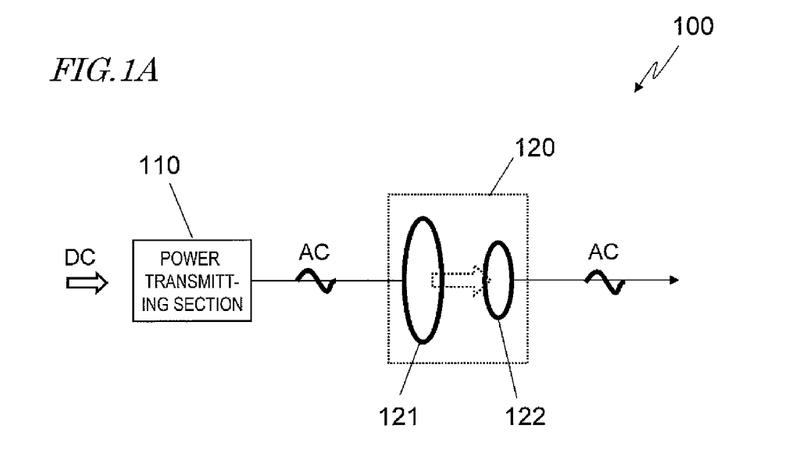
FIG. 1A is a diagram illustrating an exemplary schematic configuration of a wireless power transmission system in Embodiment 1 of the present disclosure.

FIG. 1A is a block diagram illustrating a basic configuration of a wireless power transmission system 100 according to Embodiment 1 of the present disclosure. The wireless power transmission system 100 includes a power transmitting section 110 configured to convert input direct current (DC) energy into alternating current (AC) energy and output the AC energy, and a wireless transmission section 120 configured to wirelessly transmit the AC energy output from the power transmitting section 110. The wireless transmission section 120 includes a transmitting antenna 121 and a receiving antenna 122, and wirelessly transmits the AC energy output from the power transmitting section 110 by the resonant magnetic coupling. The transmitted AC energy is supplied to a load (not shown) or the like.

Figure 1B:
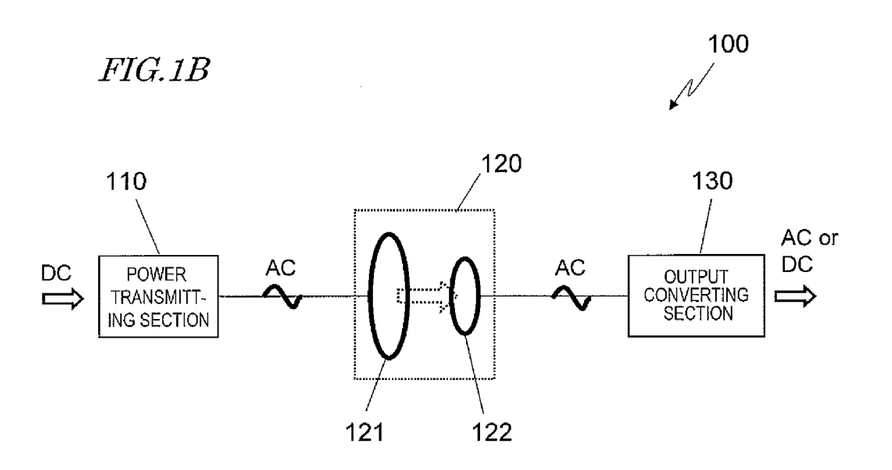
FIG. 1B is a diagram illustrating another exemplary schematic configuration of the wireless power transmission system in Embodiment 1 of the present disclosure.

As illustrated in FIG. 1B, an output converting section 130 for converting the transmitted AC energy into DC energy or AC energy having a lower frequency for output to the load or the like may be provided downstream of the receiving antenna 122. In this case, the output converting section 130 may include, for example, a known rectifier circuit, AC/DC converter, or matrix converter.

In FIGS. 1A and 1B, the transmitting antenna 121 is illustrated as being larger than the receiving antenna 122 in size. The present invention, however, is not limited to this example. The transmitting antenna 121 may be smaller than the receiving antenna 122 in size, or the transmitting antenna 121 and the receiving antenna 122 may have the same size. In the wireless transmission section 120, one or both of the transmitting antenna 121 and the receiving antenna 122 may be plural. In this embodiment, DC energy to be input to the power transmitting section 110 is supplied from an external DC energy source, but the wireless power transmission system 100 may include a DC energy source.

(Power Transmitting Section)

Figure 2:
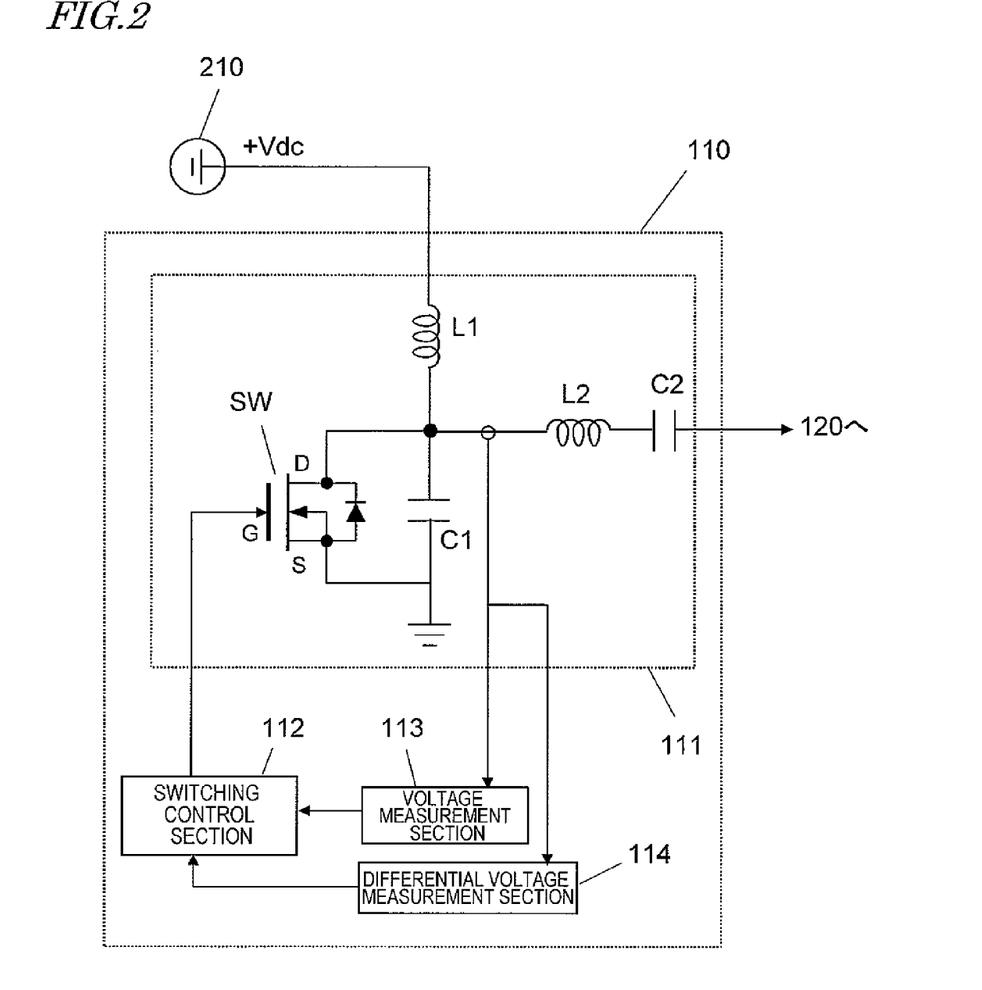
FIG. 2 is a block diagram illustrating a power transmitting section 110 in Embodiment 1 of the present disclosure.

FIG. 2 is a block diagram illustrating an exemplary configuration of the power transmitting section 110. The power transmitting section 110 includes an oscillator circuit 111 for converting DC energy of a voltage Vdc input from a DC energy source 210 into AC energy of a frequency f0 by a class-E oscillator. The oscillator circuit 111 includes a switching element SW formed of a transistor such as a MOSFET, inductors L1 and L2, and capacitors C1 and C2. The inductor L2 and capacitor C2 form a series resonance circuit having the resonant frequency f0. The switching element SW, the capacitor C1, and the series resonance circuit (L2 and C2) are connected in parallel to the DC energy source 210. This type of the oscillator circuit 111 is called "class-E oscillator circuit", which is capable of converting DC energy into AC energy of the frequency f0 through application of a control signal (pulse train of predetermined voltage) of the frequency f0 to a gate (G) of the switching element SW.

The frequency f0 may fall within the range of 50 Hz to 300 GHz and preferably falls within the range of 100 kHz to 10 GHz, more preferably within the range of 500 kHz to 20 MHz. In accordance with the intended use, the frequency f0 could also fall within the range of 10 kHz to 1 GHz or the range of 20 kHz to 20 MHz.

In this embodiment, the power transmitting section 110 further includes a voltage measurement section 113 for measuring a voltage (potential difference) between a drain (D) and a source (S) of the switching element SW, a differential voltage measurement section 114 for measuring a differential value of the voltage, and a switching control section 112 for controlling ON/OFF of the switching element SW. The switching control section 112 can be realized as appropriate by a combination of a processor such as a central processing unit (CPU) and a known gate driver. The voltage measurement section 113 is, for example, a known voltmeter, and measures a drain-source voltage Vds and transmits the measurement result to the switching control section 112. The differential voltage measurement section 114 includes a differentiating circuit such as an operational amplifier, and measures a differential value dVds/dt of the drain-source voltage and transmits the measurement result to the switching control section 112.

With the configuration described above, the switching control section 112 controls ON/OFF of the switching element SW based on the measurement results of the voltage measurement section 113 and the differential voltage measurement section 114. As used herein, "ON" means to set the source and the drain to be in a conductive state, and "OFF" means to set the source and the drain to be in a non-conductive state. In the following description, "to turn ON the gate" means to set the source and the drain to be in the conductive state by a control signal input to the gate, and "to turn OFF the gate" means to set the source and the drain to be in the non-conductive state by the control signal. The switching control section 112 turns ON the gate when a given time period determined by the value of the frequency f0 has elapsed or when the drain-source voltage Vds takes 0 (zero) or a local minimum value after the gate is turned OFF. This control can suppress the reduction in transmission efficiency even when environmental conditions around the wireless transmission section 120 have fluctuated. The details of the control by the switching control section 112 are described later. As used herein, the "transmission efficiency" is defined as the ratio of input electric power from the DC energy source 210 to this system with respect to output electric power of the wireless transmission section 120 or output electric power of the output converting section 130 corresponding to an output of this system.

(Wireless Transmission Section)

Next, the configuration of the wireless transmission section 120 is described. The wireless transmission section 120 includes the transmitting antenna 121 for transmitting AC energy of the frequency f0 output from the oscillator circuit 111 of the power transmitting section 110, and the receiving antenna 122 for receiving at least part of the transmitted AC energy. The AC energy output from the receiving antenna 122 can be supplied to a load (not shown) or a system (not shown), for example. As described above with reference to FIG. 1B, the output converting section 130 for converting the input AC energy into DC energy or AC energy having a lower frequency than f0 may be connected downstream of the receiving antenna 122. The transmitting antenna 121 and the receiving antenna 122 are opposed to each other, but are not in contact with each other and are spaced apart by about several millimeters to several meters, for example.

The transmitting antenna 121 and the receiving antenna 122 are not normal antennas for transmitting or receiving an electromagnetic wave, but are elements for transmitting energy (electric power) between two objects by using coupling that utilizes the evanescent tail of the magnetic field between resonators. In such wireless power transmission utilizing the resonant magnetic field (near field), no energy loss is caused, which is caused when an electromagnetic wave is transmitted to a distant location, and hence the electric power can be transmitted with high efficiency. Such energy transmission utilizing the coupling of a resonant magnetic field enables not only much less loss than a conventional contactless power transmission system utilizing the Faraday's law of electromagnetic induction, but also long distance transmission. For example, it is possible to transmit energy with high efficiency between two antennas separated from each other by several meters.

In order to carry out wireless power transmission based on such a principle, coupling needs to be generated between two resonators. A resonant frequency fT of the transmitting antenna 121 and a resonant frequency fR of the receiving antenna 122 are both set to values close to the oscillation frequency f0 of the oscillator circuit 111, but do not need to completely match with the oscillation frequency f0. For realizing high-efficiency energy transmission based on coupling between resonators, Equation 1 below may be satisfied.

$$|fT-fR| \le fT/QT + fR/QR \quad \text{(Equation 1)}$$

where QT is the Q factor of the transmitting antenna 121 as a resonator and QR is the Q factor of the receiving antenna 122 as a resonator. In general, when the resonant frequency is represented by X and the Q factor of a resonator is represented by Qx, a frequency range in which the resonator produces resonance is obtained by X/Qx. When the relationship of Equation 1 above is satisfied, energy can be transmitted with high efficiency between the two resonators by resonant magnetic coupling.

Figure 3A:
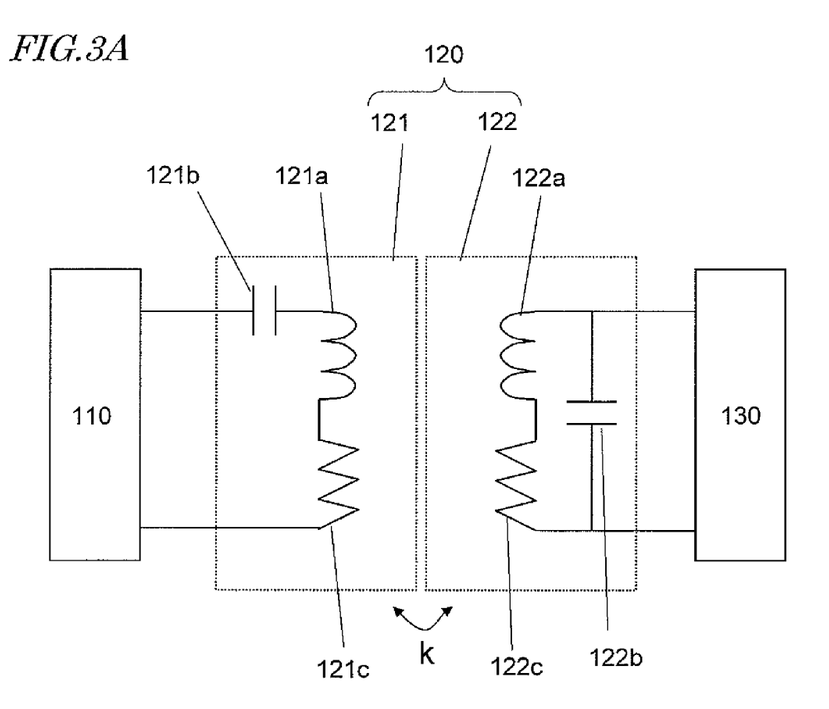
FIG. 3A is an equivalent circuit diagram of a transmitting antenna 121 and a receiving antenna 122 in Embodiment 1 of the present disclosure.

FIG. 3A is a diagram illustrating an example of an equivalent circuit of the transmitting antenna 121 and the receiving antenna 122. As illustrated in FIG. 3A, the transmitting antenna 121 is a series resonance circuit in which an inductor 121a and a capacitor 121b are connected together in series. On the other hand, the receiving antenna 122 is a parallel resonance circuit in which an inductor 122a and a capacitor 122b are connected together in parallel. The transmitting antenna 121 has a parasitic resistance 121c and the receiving antenna 122 has a parasitic resistance 122c. In the example illustrated in FIG. 3A, the transmitting antenna 121 is a series resonance circuit and the receiving antenna 122 is a parallel resonance circuit. The present invention, however, is not limited to this combination. The transmitting antenna 121 may be a series resonance circuit or a series resonance circuit, and the receiving antenna 122 may be a series resonance circuit or a parallel resonance circuit.

According to this embodiment, the efficiency of the wireless power transmission depends on the gap (antenna gap) between the transmitting antenna 121 and the receiving antenna 122 and on the magnitude of loss caused by circuit elements that form the transmitting antenna 121 and the receiving antenna 122. In this description, the "antenna gap" substantially means the gap between the two inductors 121a and 122a. The antenna gap can be estimated based on the size of the antenna arrangement area.

Figure 3B:
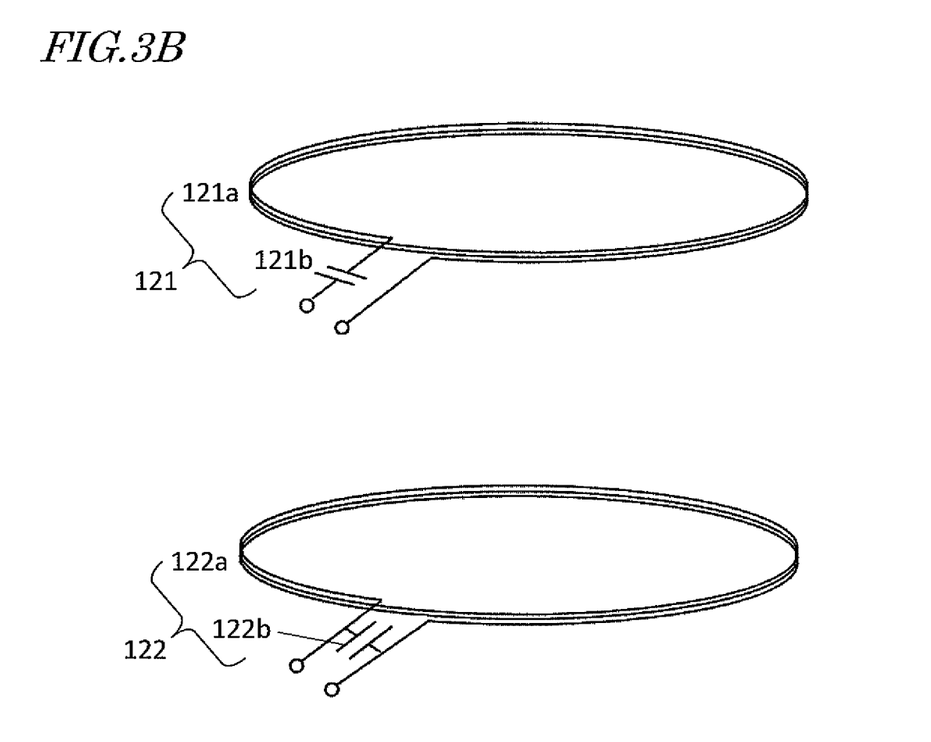
FIG. 3B is a perspective diagram illustrating an exemplary configuration of the transmitting antenna 121 and the receiving antenna 122.

FIG. 3B is a perspective diagram schematically illustrating an example of the transmitting antenna 121 and the receiving antenna 122 in this embodiment. In this embodiment, the inductors 121a and 122a can be both formed to extend in a plane as illustrated in FIG. 38. The outer profile of each inductor can be selected as appropriate. Specifically, the shape of each inductor is not limited to a circle illustrated in FIG. 3B, but may be a square, a rectangle, an oval, or the like. In this description, the "size of the antenna arrangement area" refers to the size of the arrangement area of the relatively smaller one of the antennas. Specifically, when the inductor forming the antenna has a circular outer profile, the size is defined to be the diameter of the inductor. On the other hand, when the inductor has a square outer profile, the size is defined to be the length of each side thereof. When the inductor has a rectangular outer profile, the size is defined to be the length of its shorter sides.

In this embodiment, the inductors 121a and 122a have spiral structures with the numbers of turns of N1 and N2, respectively (N1>1 and N2>1). However, the inductors 121a and 122b may also have a loop structure with the number of turns of one. These inductors 121a and 122a are not required to be made of a single-layer conductor pattern, and may also have a configuration in which a plurality of conductor patterns that have been stacked one upon the other are connected in series.

The inductors 121a and 122a can be made as appropriate of copper, silver, or other conductors with good electrical conductivity. The AC current with AC energy flows mostly around the surface of a conductor, and hence the surface of the conductor may be covered with a material with high electrical conductivity to increase the power generation efficiency. When the inductors 121a and 122a are designed so as to have a cavity in the middle of its cross section, their weight can be reduced. Further, when the inductors 121a and 122a are formed by adopting a parallel wiring structure with litz wires, for example, the conductor loss per unit length can be reduced and the Q factors of the series resonance circuit and the parallel resonance circuit can be increased. As a result, electric power can be transmitted with even higher efficiency.

In order to cut down the manufacturing cost, the wiring may be formed at a time by an ink printing technology. A magnetic body may be arranged near at least one of the inductors 121a and 122a. It is possible to use inductors having an air-core spiral structure, which can set the coupling coefficient between the inductors 121a and 122a to a moderate value.

Each inductor typically has the coil shape as described above. However, the shape is not limited thereto. At a high frequency, a conductor having a certain line length has inductance and therefore such a conductor also functions as an inductor. As another example, a conductor obtained simply by inserting a conductive wire through a ferrite bead also functions as an inductor.

From the viewpoint of transmission efficiency, the inductor 121a of the transmitting antenna 121 and the inductor 122a of the receiving antenna 122 may be opposed to each other. However, the inductors are not always required to be opposed to each other but only need to avoid being disposed orthogonal to each other.

As the capacitors 121b and 122b, any type capacitor, including a chip capacitor and a lead capacitor, can be used. It is also possible to use the capacitance between two wirings via air to function as the capacitors 121b and 122b. In the case of forming the capacitors 121b and 122b from MIM capacitors, a low-loss capacitor circuit can be formed by using a known semiconductor process or multilayer substrate process.

The Q factor of each resonator forming the transmitting antenna 121 and the receiving antenna 122 depends on antenna-to-antenna power transmission efficiency required by a system and the value of the coupling coefficient k, but is set to be preferably 100 or more, more preferably 200 or more, still more preferably 500 or more, further preferably 1,000 or more. In order to realize a higher Q factor, it is effective to adopt the above-mentioned litz wire.

Figure 3C:
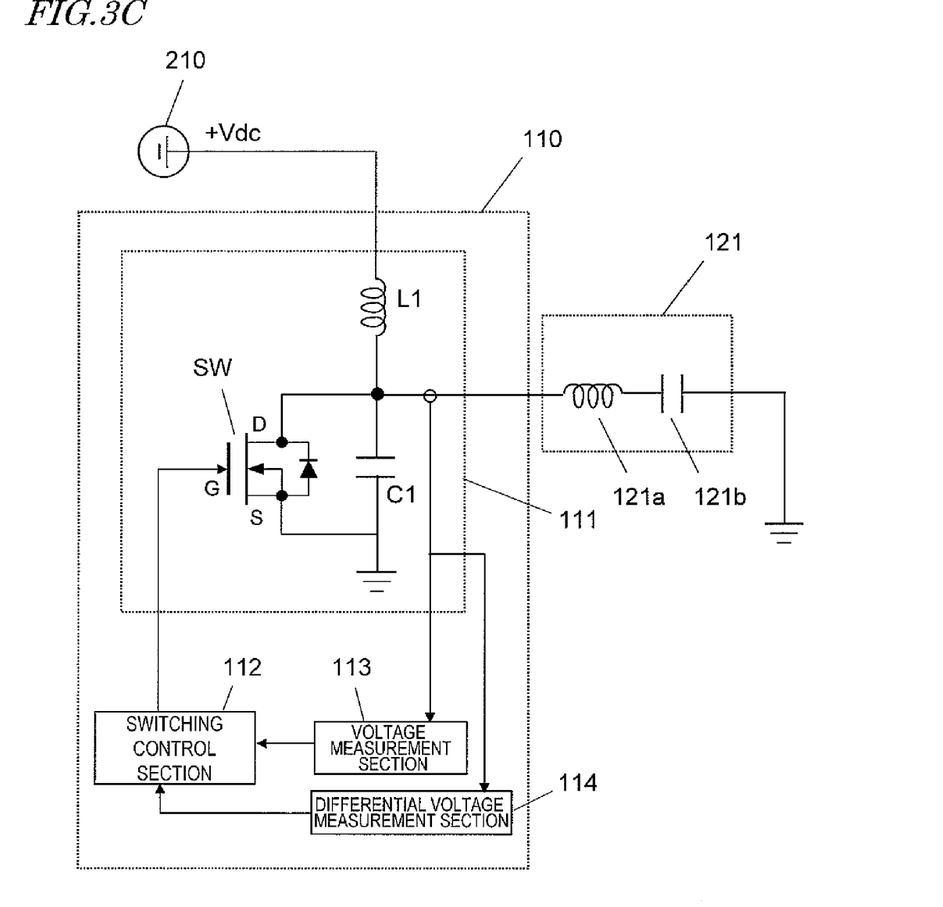
FIG. 3C is a block diagram illustrating another exemplary configuration of the power transmitting section 110 in Embodiment 1 of the present disclosure.

In the case of forming the transmitting antenna 121 by a series resonance circuit, the series resonance circuit (L2 and C2) included in the oscillator circuit 111 illustrated in FIG. 2 can be used as an alternative to the transmitting antenna 121. FIG. 3C illustrates an exemplary configuration in this case. In this exemplary configuration, the oscillator circuit 111 includes no series resonance circuit (L2 and C2). Instead, the inductor 121a and the capacitor 121b of the transmitting antenna 121 function as the inductor L2 and the capacitor C2 illustrated in FIG. 2, respectively. This configuration may be adopted to design the entire circuit so that the impedance may match between the oscillator circuit 111 and the transmitting antenna 121.

As described above, the oscillator circuit 111 is not always required to include a series resonance circuit. The above-mentioned oscillator circuit including no series resonance circuit is herein regarded as "class-E oscillator circuit" as well.

(Switching Control)

Next, switching control on the oscillator circuit 111 by the switching control section 112 in this embodiment is described.

Figure 4A:
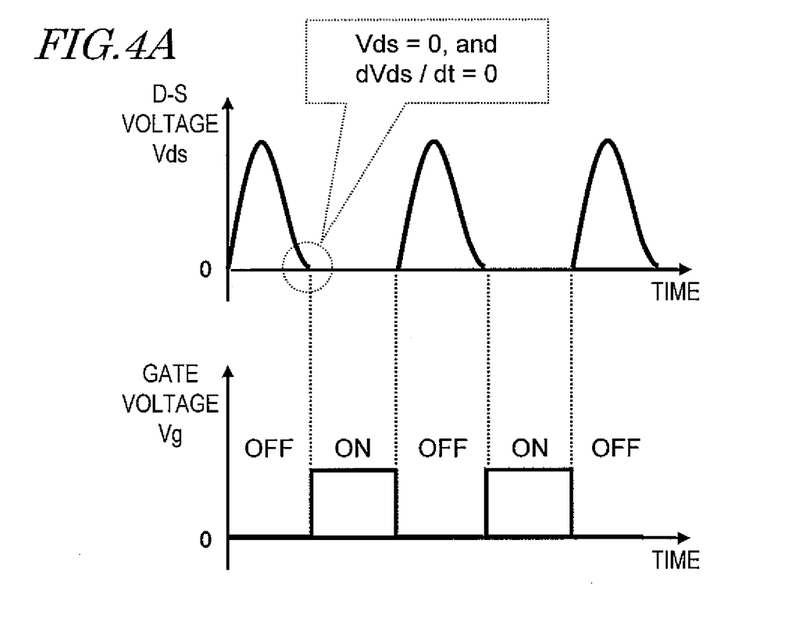
FIG. 4A is a graph showing optimum operation in a class-E oscillator circuit.

FIG. 4A is a graph showing a time change of the drain-source (D-S) voltage and a drive timing of a gate voltage Vg when the class-E oscillator circuit performs optimum operation. In general, a class-E oscillator circuit is configured so that the gate is turned ON when the drain-source voltage Vds satisfies Vds=0 and dVds/dt=0. When those conditions are satisfied, the transmission efficiency becomes the highest. Accordingly, the switching control section 112 in this embodiment also basically performs the control shown in FIG. 4A. When the switching control section 112 performs this operation, a duty cycle of the gate voltage Vg (the ratio of duration where the gate is set to be ON to one period) is 50%.

Figure 4B:
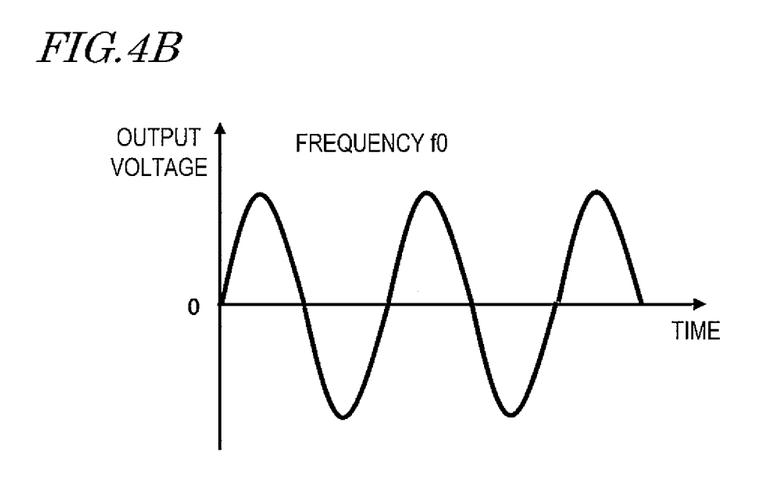
FIG. 4B is a graph showing the waveform of output energy during the optimum operation of the class-E oscillator circuit.

FIG. 4B is a graph showing the waveform of a voltage output from the oscillator circuit 111 during the above-mentioned optimum operation. Through the band-pass filtering of the series resonance circuit (inductor L2 and capacitor C2) illustrated in FIG. 2, the fundamental harmonic is extracted from the waveform of the D-S voltage Vds, and a sine wave of the frequency f0 is output.

By this operation, DC energy is converted into AC energy. However, if an ambient environment of the transmitting antenna 121 and the receiving antenna 122 has fluctuated, the above-mentioned control cannot always maintain high-efficiency power transmission. The reason is described below.

Figure 5:
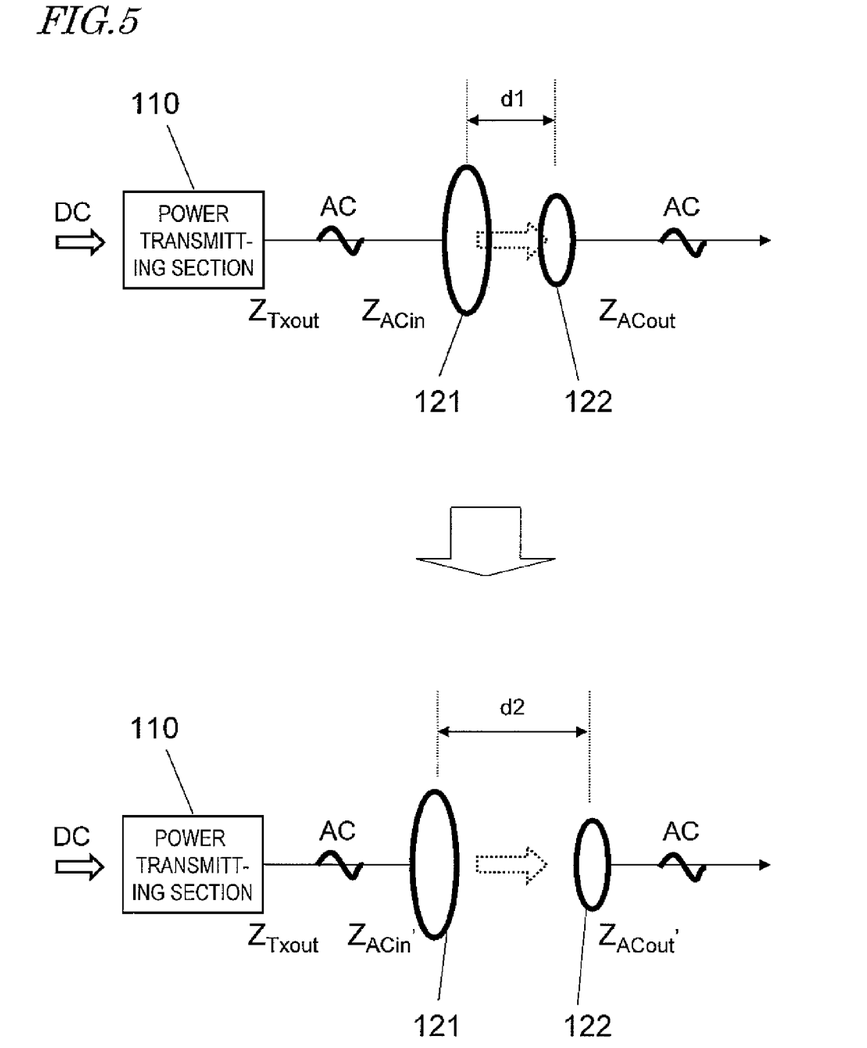
FIG. 5 is a diagram schematically illustrating fluctuations in impedance caused by fluctuations in antenna gap.

FIG. 5 is a diagram illustrating impedance fluctuations caused by a change in antenna gap, exemplifying the case where the ambient environment of the transmitting antenna 121 and the receiving antenna 122 has fluctuated. In FIG. 5, input impedance of the transmitting antenna 121 and output impedance of the receiving antenna 122 when the antenna gap is d1 are represented by $Z_{ACin}$ and $Z_{ACout}$, respectively. The respective circuit constants (inductance and capacitance) in the power transmitting section 110 are set in advance so that output impedance $Z_{Txout}$ of the power transmitting section 110 may match with the input impedance $Z_{ACin}$ of the transmitting antenna 121.

On this occasion, when the antenna gap has changed from d1 to d2, the coupling coefficient between the antennas changes. The input/output impedance ratio of the pair of transmitting and receiving antennas is proportional to the coupling coefficient, and hence, when the antenna gap has changed, the input/output impedance of the antennas changes. Consider the case where, when the antenna gap has changed to d2, the input impedance of the transmitting antenna 121 has changed to $Z'_{ACin}$, and the output impedance of the receiving antenna 122 has changed to $Z'_{ACout}$. In this case, if the output impedance of the power transmitting section 110 remains being $Z_{Txout}$, impedance mismatch occurs between the power transmitting section 110 and the transmitting antenna 121, resulting in decreased transmission efficiency. This problem is applied not only to the case where the antenna gap has increased as illustrated in FIG. 5 but also to the case where the antenna gap has decreased. Further, even when the antenna gap is constant, the same problem may occur if a substance such as a metal or a magnetic material has entered between the antennas. This phenomenon also occurs, for example, when the weight of a load of an electric vehicle having the receiving antenna 122 mounted thereon has changed. In this case, the antenna gap may change by about several tens of percent.

The impedance mismatch described above can be detected based on the time change (waveform) of the drain-source voltage Vds in the oscillator circuit 111. In the case where the input impedance of the transmitting antenna 121 has changed when an input voltage to the system is constant, the value of a drain current that flows when the switching element SW of the oscillator circuit 111 is turned ON changes. As a result, electrical energy that can be stored in the inductor L1 changes, and hence the waveform of a drain-source voltage that is generated when the switching element SW is turned OFF changes. In this manner, when the impedance mismatch occurs, a change occurs in waveform of Vds, and hence the decrease in transmission efficiency can be suppressed by adjusting a drive timing of the gate in accordance with the change in waveform of Vds.

Figure 6:
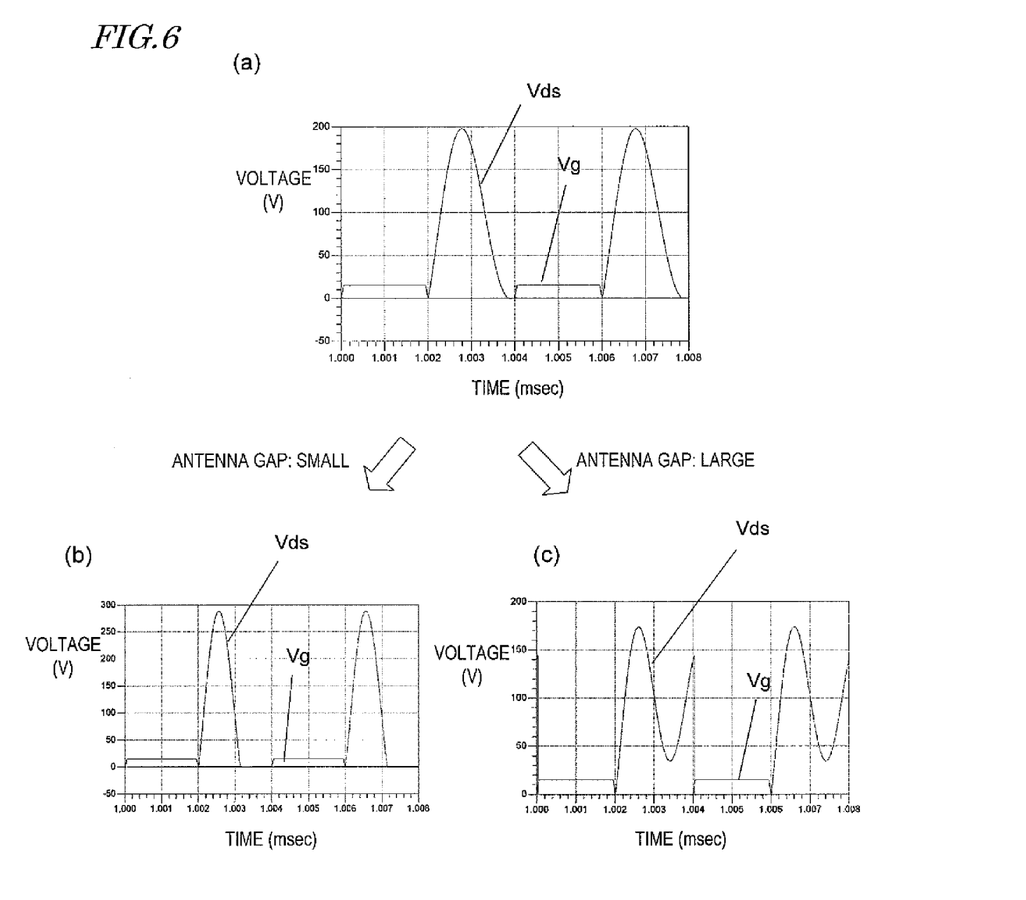
FIG. 6 is graphs showing a change in waveform of a drain-source voltage Vds caused by the fluctuations in antenna gap.

FIG. 6 is graphs showing an example of the change in waveform of the drain-source voltage Vds caused by the fluctuations in antenna gap. Part (a) of FIG. 6 is a graph showing a time change in Vds during the optimum operation, also showing a time change in gate voltage Vg. Part (b) of FIG. 6 is a graph showing a time change in Vds when the antenna gap has decreased as compared with the state shown in part (a) of FIG. 6. Part (c) of FIG. 6 is a graph showing a time change in Vds when the antenna gap has increased as compared with the state shown in part (a) of FIG. 6. As shown in parts (b) and (c) of FIG. 6, when the antenna gap changes, a change occurs in waveform of Vds. As a result, the timings at which the value of the drain-source voltage Vds and the differential value thereof become 0 and the timing of turning ON the gate do not match with each other, resulting in increased components other than the fundamental harmonic in Vds. Switching is not performed at the timing of Vds=0, and hence a switching loss in the switching element SW increases. As a result, the transmission efficiency decreases. In the following, the change pattern of the waveform of the drain-source voltage Vds shown in part (c) of FIG. 6 is referred to as "Change Pattern 1", and the change pattern of the waveform of the drain-source voltage Vds shown in part (b) of FIG. 6 is referred to as "Change Pattern 2".

In order to solve the above-mentioned problem of the decrease in transmission efficiency, the switching control section 112 in this embodiment dynamically controls the timing of turning ON the gate based on the drain-source voltage Vds. In other words, the switching control section 112 performs switching control in accordance with the change patterns of the waveform of the drain-source voltage Vds exemplified in parts (b) and (c) of FIG. 6.

Figure 7A:
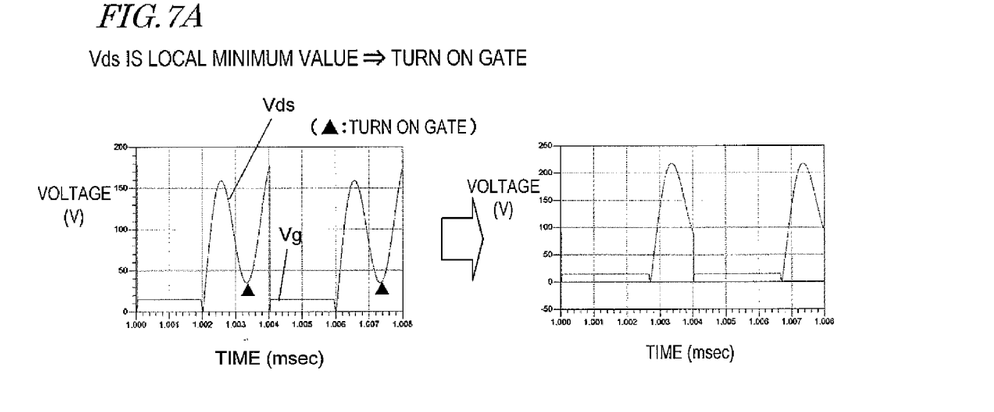
FIG. 7A is graphs showing switching control in Change Pattern 1.

FIG. 7A is graphs showing exemplary switching control performed by the switching control section 112 with respect to Change Pattern 1 shown in part (c) of FIG. 6. As shown in FIG. 7A, the switching control section 112 turns ON the gate in synchronization with the timing of dVds/dt=0. In this case, the switching control section 112 does not change the timing of turning OFF the gate. As a result, the period of the gate voltage Vg does not change, but the duty cycle increases. By this control, the drain-source voltage Vds becomes 0 at the timing where the drain-source voltage Vds takes a local minimum value even when its value is not 0.

Figure 7B:
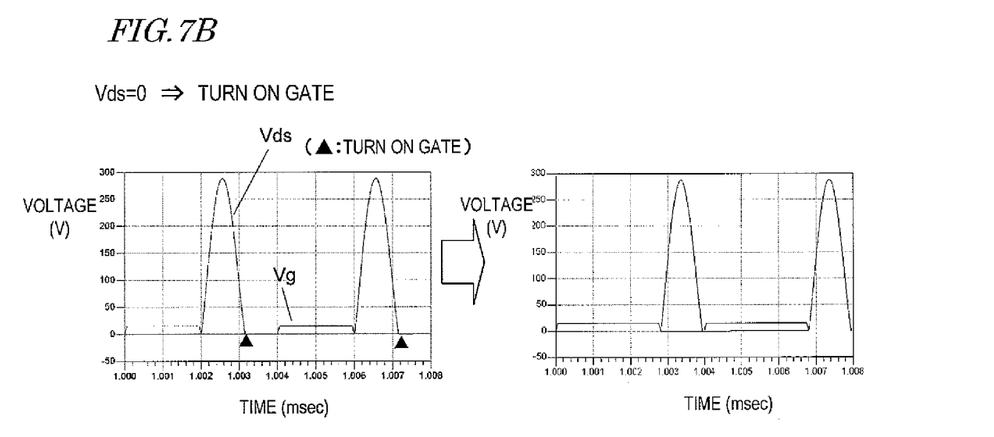
FIG. 7B is graphs showing switching control in Change Pattern 2.

FIG. 7B is graphs showing exemplary switching control performed by the switching control section 112 with respect to Change Pattern 2 shown in part (b) of FIG. 6. The switching control section 112 turns ON the gate in synchronization with the timing of Vds=0. Also in this case, the switching control section 112 does not change the timing of turning OFF the gate. Also in this control, the period of the gate drive signal is not changed, but the duty cycle increases. By this control, the drain-source voltage Vds becomes 0 at the timing of Vds=0 even when its differential value is not 0. In both the examples shown in FIGS. 7A and 7B, the control is performed so as to increase the duty cycle of the gate voltage Vg. However, control may be performed so as to decrease the duty cycle. For example, in the case where the gate will be turned ON before the drain-source voltage Vds becomes a local minimum value or 0 by switching at a normal switching timing, the duty cycle is controlled to be decreased so as to generate a timing at which the waveform of the drain-source voltage Vds becomes local minimum or a timing at which the value of Vds becomes zero.

By the switching control shown in FIGS. 7A and 7B, the wireless power transmission system in this embodiment can solve the problem of the decrease in transmission efficiency which occurs when the environmental conditions such as the antenna gap have fluctuated.

In order to solve the problem of the decrease in transmission efficiency, for example, it is conceivable to provide a large number of inductors and capacitors in the power transmitting section 110 and change the combination thereof to vary the output impedance of the power transmitting section 110. In this configuration, however, it is necessary to introduce a large number of circuit elements in the power transmitting section 110, and hence the cost increases. The transmission efficiency may decrease at the time of changing the combination of the circuit elements, and hence the effect is considered to be limited.

On the other hand, the switching control section 112 in this embodiment appropriately controls the drive timing of the gate in accordance with the waveform of the drain-source voltage Vds. In this manner, without introducing a large number of circuit elements, the decrease in transmission efficiency can be suppressed even when the waveform of the drain-source voltage Vds does not become an ideal waveform.

In this embodiment, the switching control section 112 turns ON the gate in synchronization with the timing at which the drain-source voltage Vds takes 0 or a local minimum value, but may turn ON the gate in synchronization only with the timing at which the drain-source voltage Vds takes a local minimum value. As clear from results of Example to be described later, the improvement effect of transmission efficiency is higher in the control shown in FIG. 7A than in the control shown in FIG. 7B, and hence a sufficient improvement effect can be obtained even with the control shown in FIG. 7A alone.

In this embodiment, the switching control section 112 detects the local minimum value of the drain-source voltage Vds based on the measurement results of the voltage measurement section 113 and the differential voltage measurement section 114. However, the configuration is not limited thereto. The local minimum value of the drain-source voltage Vds may be detected by any method as long as the switching control section 112 can apply a gate voltage in synchronization with the timing at which the drain-source voltage Vds takes a local minimum value. For example, without providing the differential voltage measurement section 114, the local minimum value may be detected by determining a differential value of the drain-source voltage Vds by the switching control section 112 based on the time change of the drain-source voltage Vds measured by the voltage measurement section 113. Alternatively, without providing the voltage measurement section 113 and the differential voltage measurement section 114, the timing at which the drain-source voltage Vds takes a local minimum value may be detected by directly measuring the time change of the drain-source voltage Vds by the switching control section 112.

In this embodiment, the switching element SW is formed of a transistor such as a MOSFET. However, the switching element SW may be another kind of switching element. In the present disclosure, the switching element SW may be any element as long as its conduction state is controlled by an input of a control signal. The switching control section 112 only needs to be configured to use a control signal to switch the switching element from the non-conductive state to the conductive state when a preset time period determined by the value of the frequency f0 has elapsed or the potential difference across the switching element takes a local minimum value after the switching element is switched from the conductive state to the non-conductive state.

Embodiment 2

Next, Embodiment 2 of the present disclosure is described. A wireless power transmission system in this embodiment is different from the wireless power transmission system in Embodiment 1 in that a mechanism of controlling an input voltage is further provided in addition to the components of the wireless power transmission system in Embodiment 1. The difference from Embodiment 1 is mainly described below, and description of overlapping matters is omitted.

Figure 8:
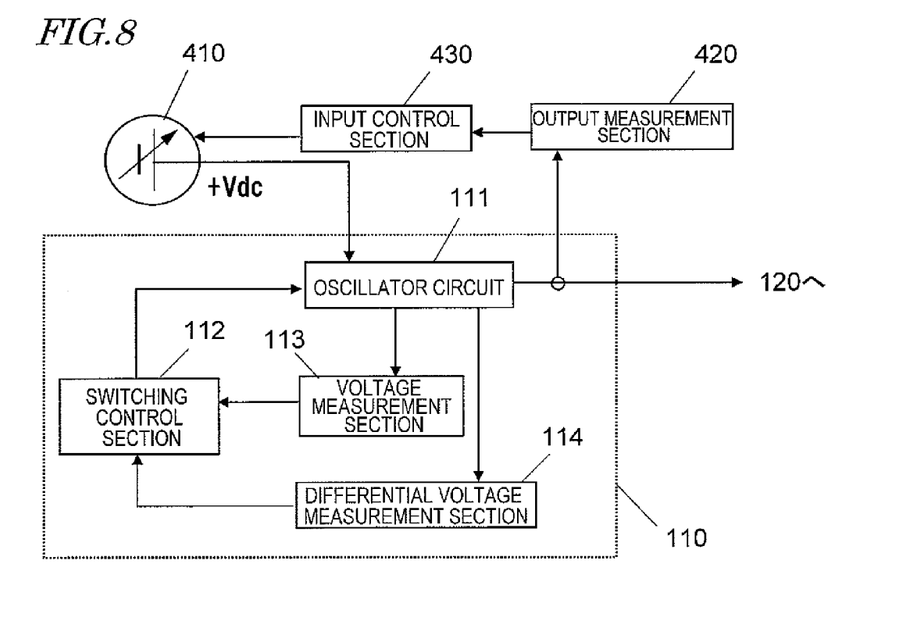
FIG. 8 is a block diagram illustrating a power transmitting section 110 and components connected thereto in Embodiment 2 of the present disclosure.

FIG. 8 is a block diagram illustrating a power transmitting section 110 and components connected thereto in this embodiment. The wireless power transmission system in this embodiment includes an output measurement section 420 for detecting fluctuations in AC energy output from the oscillator circuit 111 of the power transmitting section 110, and an input control section 430 for controlling the magnitude of DC energy input to the oscillator circuit 111 of the power transmitting section 110 in accordance with the detected fluctuations in AC energy. The output measurement section 420 is a known power meter or the like, and may have any configuration as long as the fluctuations in AC energy can be detected. The input control section 430 includes a processor such as a CPU, and controls, based on the output of the output measurement section 420, the magnitude of a DC energy Vdc input from a DC energy source 410 to the oscillator circuit 111 so that the fluctuations in AC energy may be reduced. Various configurations are possible as a specific configuration of the input control section 430. For example, in the case where the DC energy source 410 includes an AC/DC converter or a DC/DC converter using a switching element, the DC energy Vdc can be changed by changing a duty cycle of a gate voltage to the switching element at the time of conversion.

With the configuration described above, even when AC energy to be output has fluctuated due to the switching control by the switching control section 112, a constant output can be maintained. The switching control by the switching control section 112 changes the duty cycle of the gate voltage, which changes electrical energy to be output from the oscillator circuit 111. In order to supply constant electric power to a load connected downstream of the receiving antenna 122, it is necessary to adjust an input DC voltage. In view of this, in this embodiment, the output measurement section 420 and the input control section 430 are additionally provided so that output electric power of the power transmitting section 110 may be controlled to be as constant as possible. As a result, constant electric power can be supplied to the load.

In this embodiment, the output measurement section 420 is provided, but the present invention is not limited to this configuration. For example, the input control section 430 may have the function of the output measurement section instead.

The input control section 430 may have any configuration as long as DC energy input to the oscillator circuit 111 can be controlled so as to reduce the fluctuations in AC energy output from the power transmitting section 110. The input control section 430 and the output measurement section 420 may be included inside the power transmitting section 110.

In each of the above-mentioned embodiments, the power transmitting section 110 is a component of the wireless power transmission system, but the power transmitting section 110 may be configured as a standalone device. In this case, the power transmitting section 110 can be manufactured and distributed as a standalone power transmitter. Such a power transmitter does not always have to be used in a wireless power transmission system. The power transmitter may be used widely for purposes of providing common electrical appliances (loads), impedance of which may change, with AC power.

Example

Example of the present disclosure is described below. In Example, a circuit simulator was used to compare the changes in transmission efficiency with the use of a model having a varied antennal gap, thereby examining the effects of the embodiments of the present disclosure. First, the specifications of the transmitting antenna 121 were set such that the diameter was 20 cm, the number of turns was 35, the number of parallel connections was 3, the Q factor was 678, and the resonant capacitor capacitance was 3,600 pF, and the specifications of the receiving antenna 122 were set such that the diameter was 15 cm, the number of turns was 25, the number of parallel connections was 1, the Q factor was 378, and the resonant capacitor capacitance was 8,130 pF. Next, the DC voltage Vdc input to the power transmitting section 110 was set to 50 V, and the circuit constants of the resonance circuits of the power transmitting section 110 were set so that the inductance value of L1 was 19 uH, the Q factor was 110, and the capacitance of C1 was 5,000 pF and the inductance value of L2 was 3.6 uH, the Q factor was 90, and the capacitance of C2 was 120,000 pF. Then, the oscillation frequency f0 was set to 250 kHz. The respective circuit constants were set so as to be optimum when the antenna gap was 2.4 cm and the duty cycle of the gate voltage of the switching element SW was 50%. Next, the ratio between the input impedance $Z_{ACin}$ of the transmitting antenna and the output impedance $Z_{ACout}$ of the receiving antenna caused by the fluctuations in antenna gap was measured. In this case, when the antenna gap was 2.4 cm, $Z_{ACin}/Z_{ACout}$=38Ω/110Ω was established, and when the antenna gap was 4.2 cm, $Z_{ACin}/Z_{ACout}$=28.5Ω/205Ω was established. In Example, the antenna gap was set to a plurality of values, and the transmission efficiency was measured for each of the antenna gaps under the conditions where the control of Embodiment 1 was performed and not performed. The transmission efficiency was measured both in terms of transmission efficiency in the power transmitting section 110 and in terms of transmission efficiency in the entire system.

Figure 9:
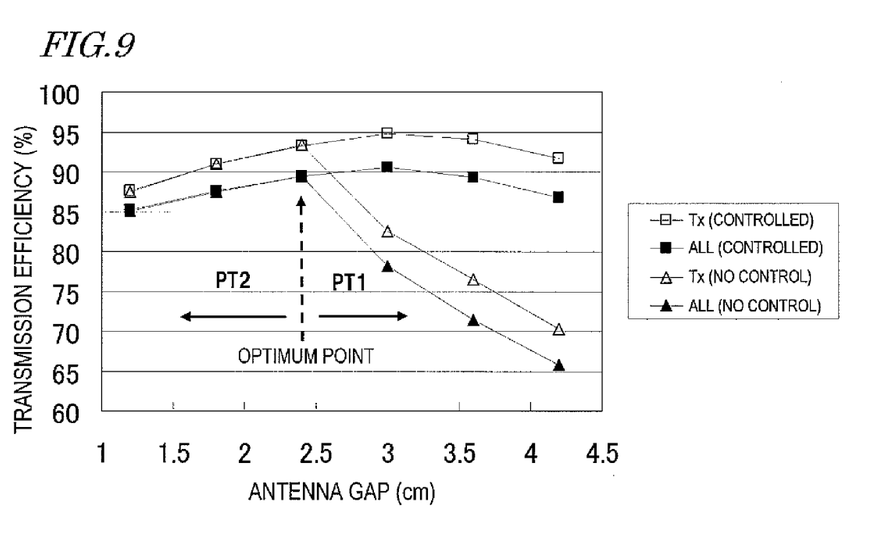
FIG. 9 is a graph showing the effects of improving transmission efficiency in Example of the present disclosure.

FIG. 9 is a graph showing the fluctuations in transmission efficiency with respect to the fluctuations in antenna gap. In FIG. 9, the transmission efficiencies in the power transmitting section 110 and in the entire system under the condition where the control of Embodiment 1 was performed are represented by "Tx (controlled)" and "ALL (controlled)", respectively. Similarly, the transmission efficiencies in the power transmitting section 110 and in the entire system under the condition where the control was not performed are represented by "Tx (no control)" and "ALL (no control)", respectively. In FIG. 9, a point at which the antenna gap is 2.4 cm is represented by "optimum point", and a change pattern in the case where the antenna gap is longer than that at the optimum point is represented by PT1 and a change pattern in the case where the antenna gap is shorter than that at the optimum point is represented by PT2. When the antenna gap was longer than that at the optimum point, the control shown in FIG. 7A was performed, and when the antenna gap was shorter than that at the optimum point, the control shown in FIG. 7B was performed.

In Example, the transmission efficiency in the power transmitting section 110 alone was improved by about up to 21%, and the transmission efficiency in the entire system was improved by about up to 20%. As shown in FIG. 9, the effects of the embodiments of the present disclosure were found to be more remarkable in Change Pattern 1 (PT1).

The technique of the present disclosure is applicable to a power generating system such as a solar power generating system and to a power charging and supply system for an electric vehicle or an electronic device, for example.

While the exemplary embodiments of the invention has been described, it will be apparent to those skilled in the art that the disclosed exemplary embodiments may be modified in numerous ways and may assume many embodiments other than those specifically described above. Accordingly, it is intended by the appended claims to cover all modifications of the exemplary embodiments that fall within the true spirit and scope of the invention.

What is claimed is:

1. A wireless power transmission system, comprising:
    a power transmitting section configured to convert DC energy input from a DC energy source into AC energy of a frequency f0, the power transmitting section comprising:
        a class-E oscillator circuit including a switching element and a capacitor which are connected in parallel to the DC energy source, the class-E oscillator circuit configured to convert the DC energy into the AC energy; and
        a switching control section configured to input a control signal for controlling a conduction state of the switching element to the switching element, and use the control signal to switch the switching element from a non-conductive state to a conductive state one of when a preset time period determined by a value of the frequency f0 has elapsed and when a potential difference across the switching element takes a local minimum value after the switching element is switched from the conductive state to the non-conductive state;
    a transmitting antenna configured to transmit the AC energy converted by the power transmitting section;
    a receiving antenna configured to receive and output at least part of the AC energy transmitted by the transmitting antenna, and
    an input control section configured to control a magnitude of the DC energy input to the power transmitting section in accordance with fluctuations in the AC energy output from the power transmitting section.

2. The wireless power transmission system of claim 1, wherein the switching control section is configured to use the control signal to switch the switching element from the non-conductive state to the conductive state when the potential difference across the switching element becomes 0 after the switching element is switched from the conductive state to the non-conductive state.

3. The wireless power transmission system of claim 1, wherein:

the power transmitting section further comprises a differential voltage measurement section configured to measure a differential value of a voltage across the switching element and output the measured differential value to the switching control section; and the switching control section is configured to detect, based on an output of the differential voltage measurement section, a timing at which the potential difference across the switching element becomes local minimum.

4. The wireless power transmission system of claim 1, wherein:

the power transmitting section further comprises a voltage measurement section configured to measure a value of a voltage across the switching element and output the measured value to the switching control section; and the switching control section is configured to detect, based on an output of the voltage measurement section, a timing at which the potential difference across the switching element becomes local minimum.

5. The wireless power transmission system of claim 1, wherein:

the switching element comprises a field-effect transistor; and the switching control section inputs the control signal to a gate of the switching element, thereby controlling a conduction state between a source and a drain of the switching element.

6. The wireless power transmission system of claim 1, further comprising an output converting section configured to convert the AC energy output from the receiving antenna into one of DC energy and AC energy of a frequency lower than the AC energy and outputting the converted energy.

7. The wireless power transmission system of claim 1, further comprising a DC energy source configured to input the DC energy to the class-E oscillator circuit.

8. A power transmitter that converts DC energy input from a DC energy source into AC energy of a frequency f0, comprising:

a class-E oscillator circuit including a switching element and a capacitor which are connected in parallel to the DC energy source, the class-E oscillator circuit configured to convert the DC energy into the AC energy;

a switching control section configured to input a control signal for controlling a conduction state of the switching element to the switching element, the switching control section being configured to use the control signal to switch the switching element from a non-conductive state to a conductive state one of when a preset time period determined by a value of the frequency f0 has elapsed and when a potential difference across the switching element takes a local minimum value after the switching element is switched from the conductive state to the non-conductive state, and an input control section configured to control a magnitude of the input DC energy in accordance with fluctuations in the AC energy output from the oscillator circuit.

9. The power transmitter of claim 8, wherein the switching control section is configured to use the control signal to switch the switching element from the non-conductive state to the conductive state when the potential difference across the switching element becomes 0 after the switching element is switched from the conductive state to the non-conductive state.

* * * * *